(12) United States Patent
Ou et al.

(10) Patent No.: US 10,960,489 B2
(45) Date of Patent: Mar. 30, 2021

(54) WIRE TERMINATION WELDER AND METHOD

(71) Applicant: Tech-Sonic, Inc., Columbus, OH (US)

(72) Inventors: Byoung Soo Ou, Dublin, OH (US); David Lee Cyphert, Canal Winchester, OH (US)

(73) Assignee: TechSonic, Inc., Columbus, OH (US)

( * ) Notice: Subject to any disclaimer, the term of this patent is extended or adjusted under 35 U.S.C. 154(b) by 299 days.

(21) Appl. No.: 16/119,077

(22) Filed: Aug. 31, 2018

(65) Prior Publication Data

US 2020/0070276 A1 Mar. 5, 2020

(51) Int. Cl.
| | | |
|---|---|---|
| *B23K 20/10* | (2006.01) | |
| *H01R 43/02* | (2006.01) | |
| *H01B 7/02* | (2006.01) | |
| *B23K 101/32* | (2006.01) | |

(52) U.S. Cl.
CPC ......... *B23K 20/10* (2013.01); *H01R 43/0207* (2013.01); *B23K 2101/32* (2018.08); *H01B 7/02* (2013.01)

(58) Field of Classification Search
None
See application file for complete search history.

(56) References Cited

U.S. PATENT DOCUMENTS

| | | | | | |
|---|---|---|---|---|---|
| 4,596,352 | A | * | 6/1986 | Knapp | B23K 20/106 228/1.1 |
| 4,817,814 | A | * | 4/1989 | Goto | B23K 20/10 228/1.1 |
| 6,299,052 | B1 | * | 10/2001 | Wnek | B23K 20/10 228/110.1 |
| 9,112,286 | B2 | * | 8/2015 | Torimoto | B23K 20/10 |
| 2004/0088857 | A1 | * | 5/2004 | Fujimoto | H01R 43/0207 29/871 |
| 2005/0199676 | A1 | * | 9/2005 | Stroh | B23K 20/106 228/1.1 |
| 2007/0257088 | A1 | * | 11/2007 | Steiner | H01L 24/85 228/110.1 |
| 2010/0170935 | A1 | * | 7/2010 | Stroh | B23K 20/10 228/110.1 |

(Continued)

FOREIGN PATENT DOCUMENTS

GN 206781045 U * 12/2017

*Primary Examiner* — Devang R Patel
(74) *Attorney, Agent, or Firm* — Mueller Law, LLC; Jerry K. Mueller, Jr.

(57) ABSTRACT

An ultrasonic welding assembly joins bare ends of an insulated wire bundle to a wire terminal in a weldment zone by intimate contact with a sonotrode of an ultrasonic stack. A door allows the operator to place the terminal into the nest within the weldment zone. One operator hand holds the wire bundle while one contacts an external sensor. A pair of terminal clamps extend inwardly and down to secure the terminal and create a taller capture area for the loose bare wire ends. A pair of clamp finger assemblies reversibly extend towards the insulated wires away from the weldment zone for securing the wires. A wire gatherer descends upon and captures all of the wire bare ends and secures them until the horn descends, captures, and holds the wire ends in place, then extends away from the weldment zone for ultrasonic welding to commence.

5 Claims, 12 Drawing Sheets

(56) References Cited

U.S. PATENT DOCUMENTS

| | | | | |
|---|---|---|---|---|
| 2011/0155701 A1* | 6/2011 | Gerst | ............... | B23K 11/0026 |
| | | | | 219/117.1 |
| 2012/0298645 A1* | 11/2012 | Kleespiess | ............ | H01R 4/029 |
| | | | | 219/137 R |
| 2019/0165533 A1* | 5/2019 | Nabeta | ................... | H01R 43/28 |
| 2019/0393665 A1* | 12/2019 | Katou | ................. | B23K 20/004 |

* cited by examiner

WIRE TERMINATION WELDER AND METHOD

CROSS-REFERENCE TO RELATED APPLICATIONS

None.

STATEMENT REGARDING FEDERALLY SPONSORED RESEARCH

Not applicable.

BACKGROUND

The use of high-frequency ultrasonic vibrations to create a weld between materials has been known since the 1960s. Ultrasonic welders create a weld using friction generated by the ultrasonic vibrations applied to the materials, rather than application of heat to the materials. Ultrasonic welding has proven to be effective in joining both plastics and metals, and has been applied in a number of industries, from toy production to the automotive and aerospace industries. Ultrasonic welds are popular due to the ease with which a weld can be created and the low cost per weld. Ultrasonic welds are ideal for joining small parts.

Ultrasonic welding is an alternative method to arc or heat welding, or soldering, eliminating consumables, such as solder or flux, component burn back, cooling water requirements, and high-energy use. An additional advantage of ultrasonic welding operations is the minimal heat that is generated during the welding process, minimizing component damage.

Ultrasonic metal welding is adapted for the assembly of similar and dissimilar non-ferrous metals used in electronic components and pipe sealing. Parts to be joined by ultrasonic welds are held together under pressure between the ultrasonic horn and anvil. Ultrasonic vibrations of a frequency of about 20 to 40 kHz are applied, and vibration of the horn causes the parts to scrub together, with resultant shear forces removing surface contaminants and exposing bare metal areas.

This intense friction applied to the weld as the two parts are simultaneously pressed together breaks the oxide skins of the substrate metals. When applied to metals, a weld is achieved not by melting materials, but through the creation of a solid-state weld. The ultrasonic vibrations cause shearing and deformation of surface asperities, which disperses oxides and contaminants existing on the subject materials, which allows for metal-to-metal contact and bonding of the adjacent surfaces. These processes bring the two materials into sufficiently intimate contact for atomic level bonding to occur. The materials' atomic structures are co-mingled creating a strong, surface molecular, solid-state bond that is clean and has low electrical resistance. The relatively slight rise in temperature created by the friction is well below melting point and plays no essential part in creating the weld.

The basic components of ultrasonic welding systems are a press, an anvil, an ultrasonic stack, an ultrasonic generator or power supply, and an electronic controller. The workpieces to be welded are placed between the press and the anvil, with the press applying pressure to the pieces. The anvil allows the ultrasonic vibrations to be directed to the surfaces of the materials. The nest or anvil, where the workpieces (parts) are placed, allows the high frequency vibration generated by the stack to be directed to the interfaces of the weld substrates.

The ultrasonic stack is commonly composed of a converter, a booster, and a Sonotrode or "horn." The converter converts the electrical energy into a mechanical vibration; the booster modifies the amplitude of the vibration; and the sonotrode applies mechanical vibration to the parts to be welded. These three elements are typically tuned to resonate at the same ultrasonic frequency (typically 20, 35 or 40 kHz). These stack components are connected to an electronic ultrasonic generator that delivers high power AC signal to the stack, while matching the resonance frequency of the stack.

An ideal ultrasonic welding system provides the user with control over the maximum number of the variables in the process. Variations between materials, as well as variations in contaminants present in a material, can necessitate adaptability in weld velocity and compression force to maintain weld strength. Common systems, including pneumatic ultrasonic welding systems, often lack the necessary variability in weld speed and pressure to complete an ideal weld. Pneumatic systems also suffer great drops in quality of their welds when outside contaminants, such as grease, and oil, which are often present in industrial air supplies, are able to infiltrate the system.

For example, commonly owned U.S. application Ser. No. 15/927,114 discloses an ultrasonic welding apparatus that joins metal pieces, such as wires, which are placed in a weldment zone where the metal pieces are subjected to pressure through a compressive height anvil and an adjustable width anvil, and intimate contact is made with a sonotrode of an ultrasonic stack. A first electric motor actuates movement of the height anvil to develop a compressive force for ultrasonic welding of the metal pieces. A sensor, such as a load cell, measures the compressive force developed. The sensor directly can measure the load on the height anvil independent of the ultrasonic stack. A software algorithm can compensate for deflection of the load cell sensor and lost motion in the first electric motor actuating movement. A similar sonotrode and electric motor actuation also finds advantage in the present disclosure.

BRIEF SUMMARY

An ultrasonic welding assembly joins insulated wires with bare ends to a wire terminal in a weldment zone where the wire bare ends and wire terminal are joined by intimate contact with a sonotrode of an ultrasonic stack. A door allows the operator to place the terminal into the nest within the weldment zone. One operator hand holds the wire bundle while one contacts an external sensor. The door must be closed for ultrasonic welding to occur. A pair of terminal clamps extend inwardly and down to secure the terminal and create a taller capture area for the loose bare wire ends. A pair of clamp finger assemblies reversibly extend towards the insulated wires away from the weldment zone for securing the wires. Before ultrasonic welding commences, a wire gatherer descends upon and captures all of the wire bare ends and secures them until the horn descends, captures, and holds the wire ends in place, then extends away from the weldment zone for ultrasonic welding to commence. Post ultrasonic welding, an overhead crimper crimps the terminal wings.

BRIEF DESCRIPTION OF THE DRAWINGS

For a fuller understanding of the nature and advantages of the present method and process, reference should be had to the following detailed description taken in connection with the accompanying drawings, in which.

The drawings will be described in greater detail below.

DETAILED DESCRIPTION

The disclosed ultrasonic wire termination welder has many advantages, including, for example, high volume production with high quality weld consistency of the weld with accuracy and repeatability, high pull test results with high CPK values (process capability index—a statistical tool to measure the ability of a process to produce within customer's specification limits), 20-30% more output due to faster cycle times using an electric motor compared to use of a pneumatic cylinders: high output with low power requirement, lower power requirement versus pneumatics for similar size welds, short cycle times and minimal wasted movement, flexibility: wide welding range with a single unit, sustainability: increased tooling life, reduced tooling breakage, reduced stress on ultrasonic horn increasing tooling life, reduced stress on wires and terminals minimizing broken or damaged strands or female terminals, and missing strand and wire detection under 3% of the CSA or cross sectional area (volume).

Figure 1:
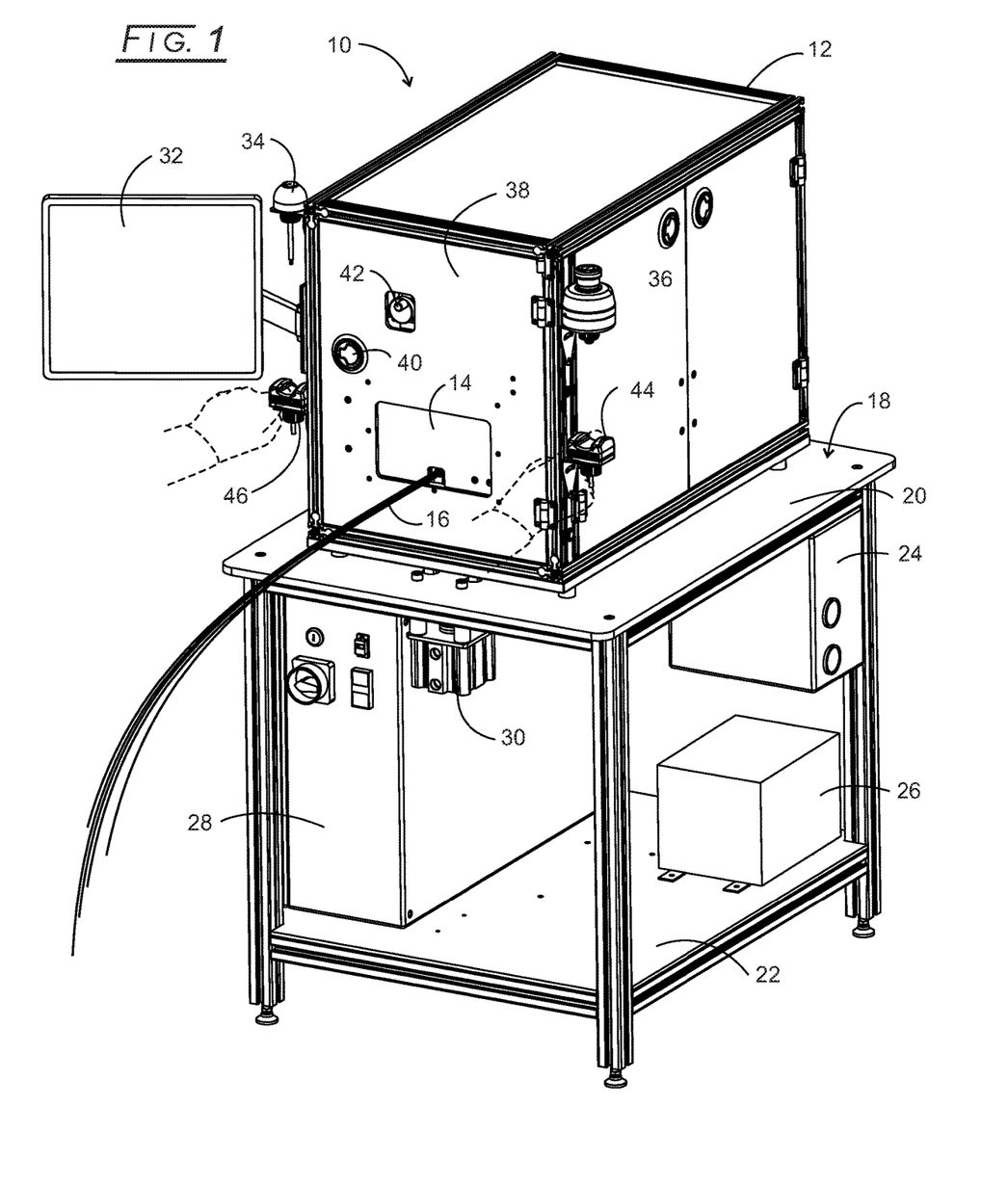
FIG. 1 is a front isometric view of the disclosed ultrasonic wire termination welder in its welding position as indicated by the operator's hands in phantom located in contact with optical proximity sensors.

Referring now to FIG. 1, a weld termination welder, 10, is shown in its welding or active position. A safety guard assembly, 12, surrounds welder 10 in order to isolate it from the operator and other personnel in the vicinity of welder 10. An access door, 14, is in its closed position in FIG. 1 (and open position in FIG. 2) preventing ingress into welder 10, but having a small aperture permitting the wires to be welded, 16, to extend into welder 10 for weld termination. Safety guard assembly 12 sits atop a table assembly, 18, having an upper base plate, 20, and a lower base plate, 22. Extending downwardly from upper base plate 20 is a pneumatic controller, 24. Sitting on lower table 22 is a transformer, 26. Sitting upon lower table 22 is a control box, 28, and extending downwardly from upper table 20 and adjacent to control box 28 is a cutter linear actuator, 30.

A display, 32, extends outwardly from safety guard assembly 12. Adjacent to display 32 is a status signal light with buzzer, 34. Disposed on the opposite side from display 32 is an emergency shutoff switch, 36. A hinged front door, 38, retains access door 14 wherein access door 14 slides upwardly thereinto. Front door 38 is secured by a latch, 40. A second aperture in front door 38 reveals an adjustment knob, 42, for the crimper (described later herein). On either side of safety guard assembly 12 are a pair of optical proximity sensors, 44 and 46. A pair of operator hands (shown in phantom) are seen in contact with the optical proximity sensors. No welding will proceed until at least one of optical proximity sensors senses the operator's hand/fingers. This is a safety feature to prevent the operator to have his/her hands extended to within the welding zone. The other operator hand usually holds the wire bundle outside of the door.

Figure 2:
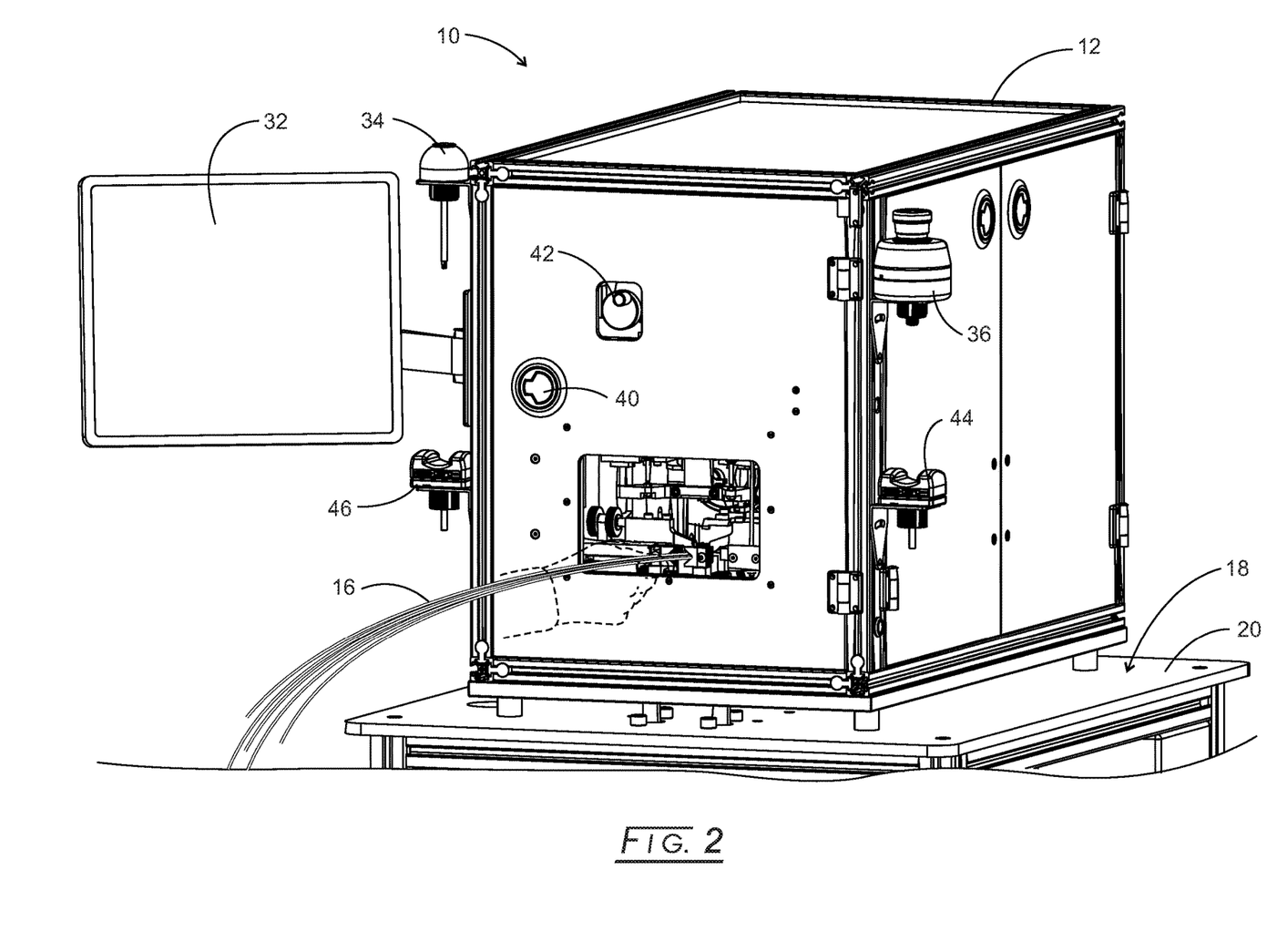
FIG. 2 is a closer front isometric view of the ultrasonic wire termination welder in its home (non-welding) position as indicated by the operator's hand in phantom inserting a bundle of wires into the welder.

In FIG. 2, access door 14 has been moved upwardly into front door 38 so that the operator can move wires 16 to within safety guard assembly 12 and into the welding zone for weld termination. An operator hand shown in phantom in FIG. 2 is executing the movement of wires 16 into the welding zone. The various components housed within safety guard assembly 12 will be described in detail below.

Figure 3:
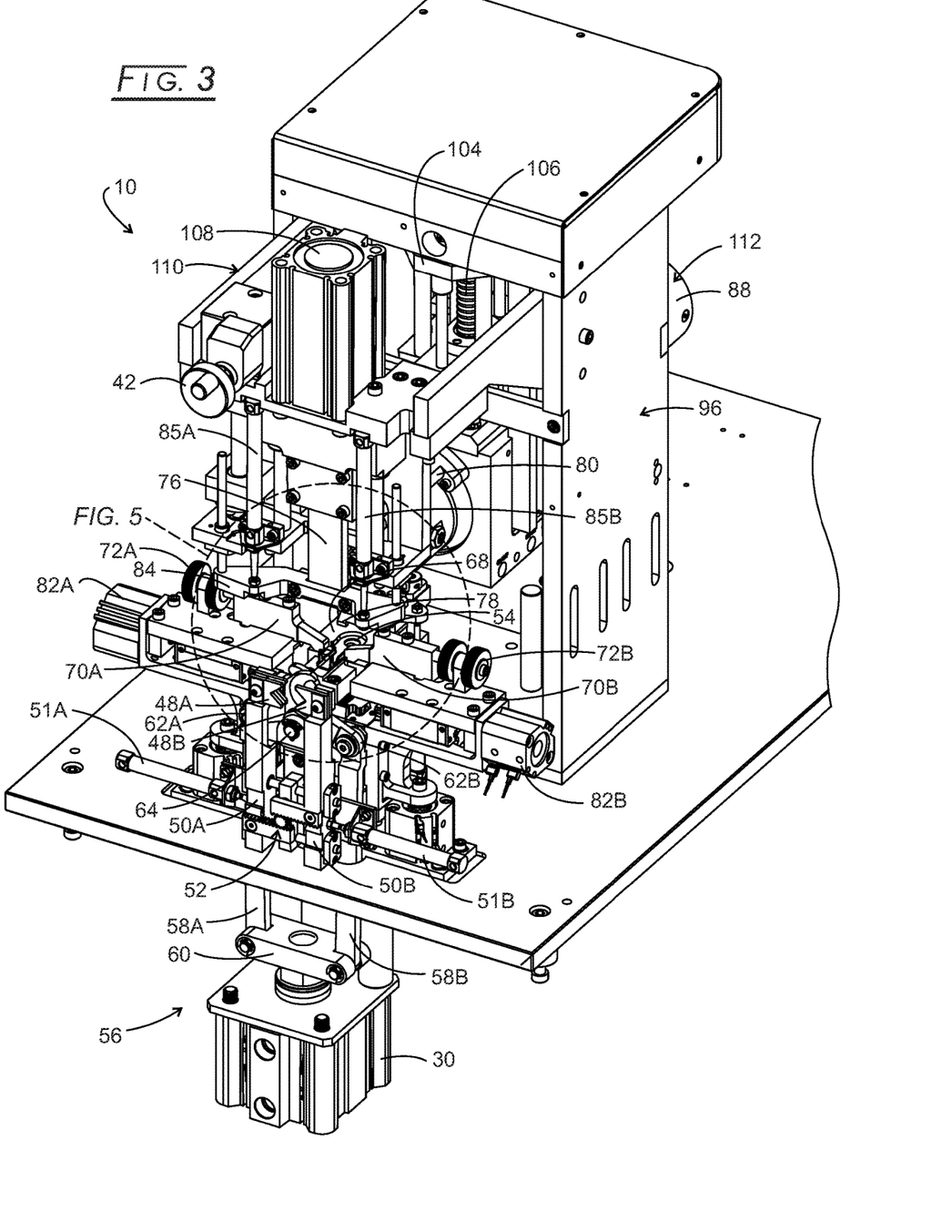
FIG. 3 is a front isometric view of the disclosed ultrasonic wire termination welder with the safety guard assembly removed to reveal its inner components.
Figure 4:
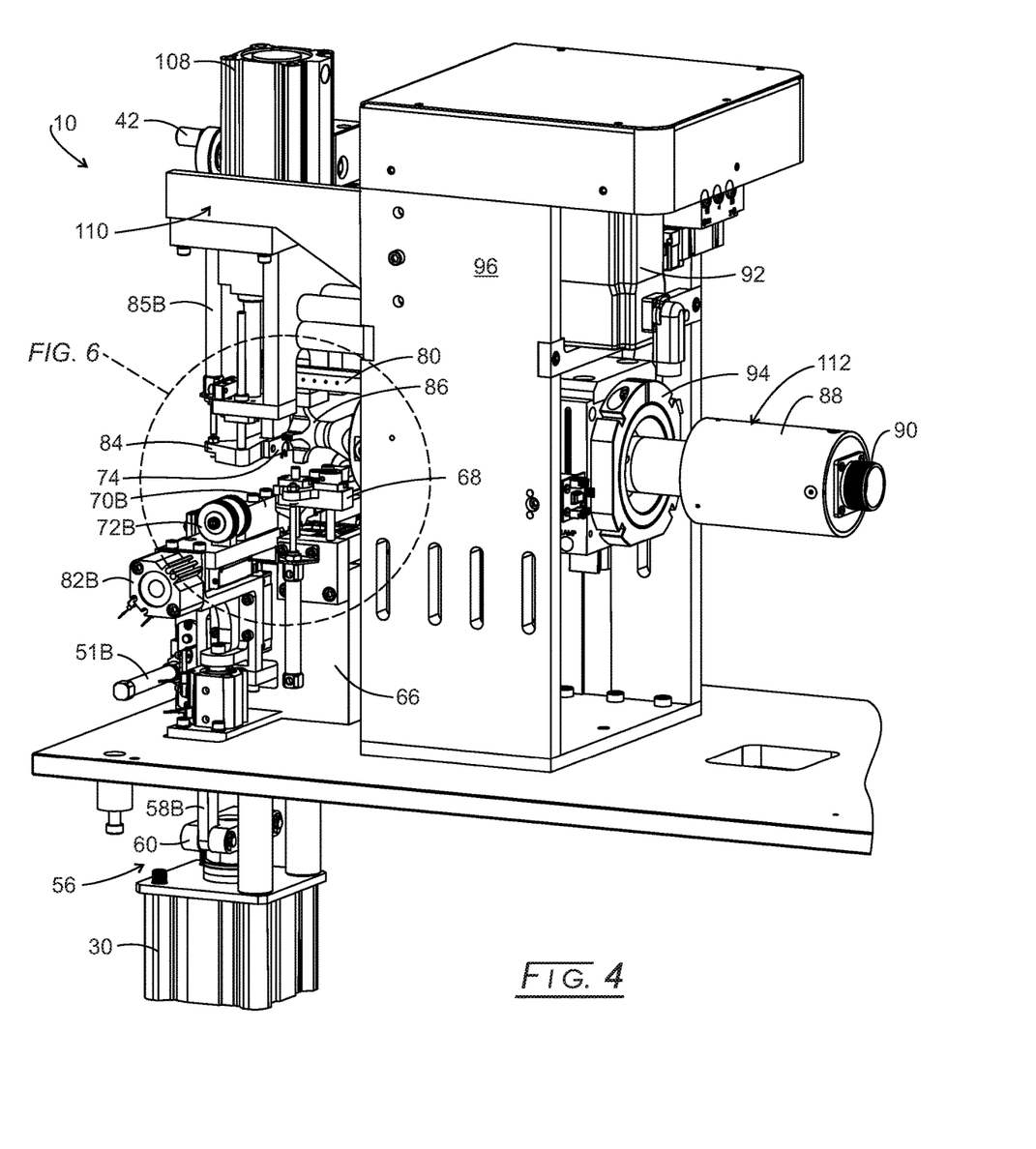
FIG. 4 is a side isometric view of the disclosed ultrasonic wire termination welder shown in FIG. 3.
Figure 5:
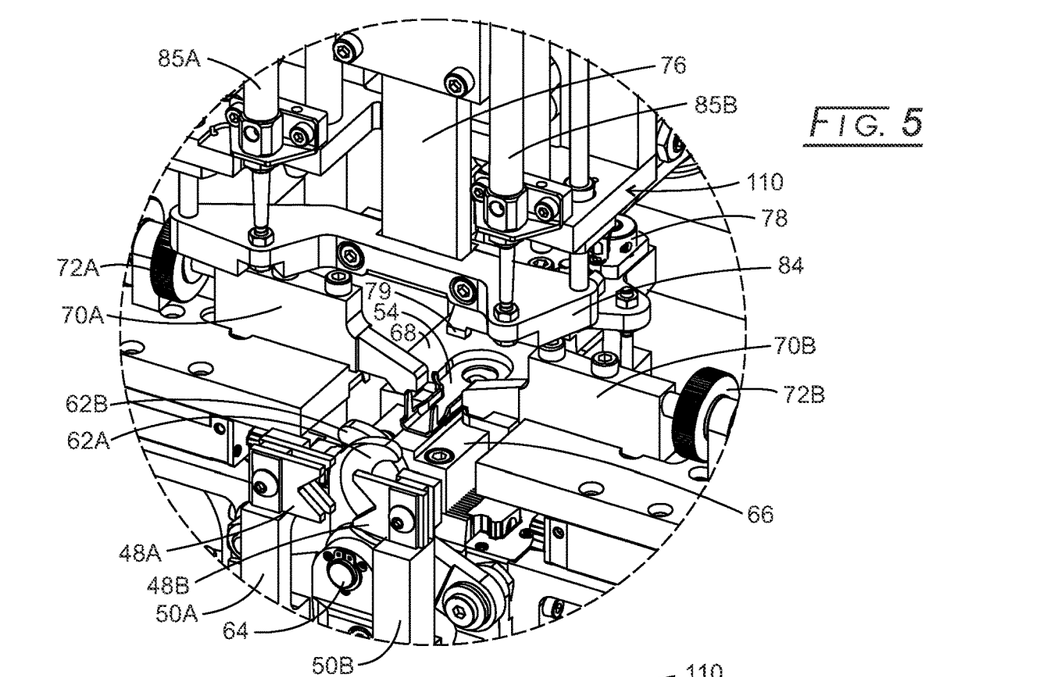
FIG. 5 is an enlarged view from FIG. 3.
Figure 6:
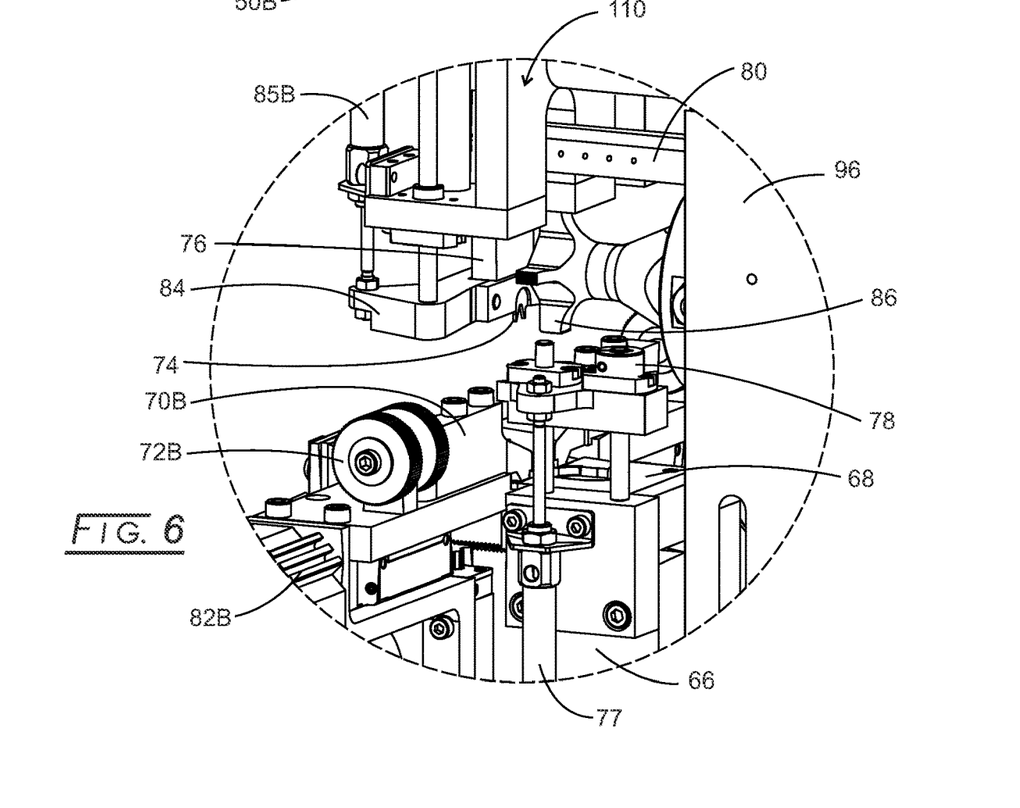
FIG. 6 is an enlarged view from FIG. 4.

Referring now to FIGS. 3 and 4, along with the enlarged views shown in FIGS. 5 and 6, when wires 16 pass into the welder, they initially pass through a pair of clamp finger assemblies, 48A and 48B (see FIGS. 12 and 13), mounted on arms, 50A and 50B, which in turn are mounted to a rack and pinon assembly, 52, that center clamp finger assemblies 48A/48B on a wire terminal, 54, placed into the welder for weld attachment to wires 16. Clamp finger assembly 48A has a pair of fingers, while clamp finger assembly 48B has a single finger located to extend between the pair of fingers of clamp finger assembly 48A absent any wires located therebetween. When actuated, clamp finger assemblies 48A/48B move inwardly by linear actuators, 51A/51B, to grasp wires 16 and hold them centered with wire terminal 54 for weld attachment, as described later herein.

Figure 10:
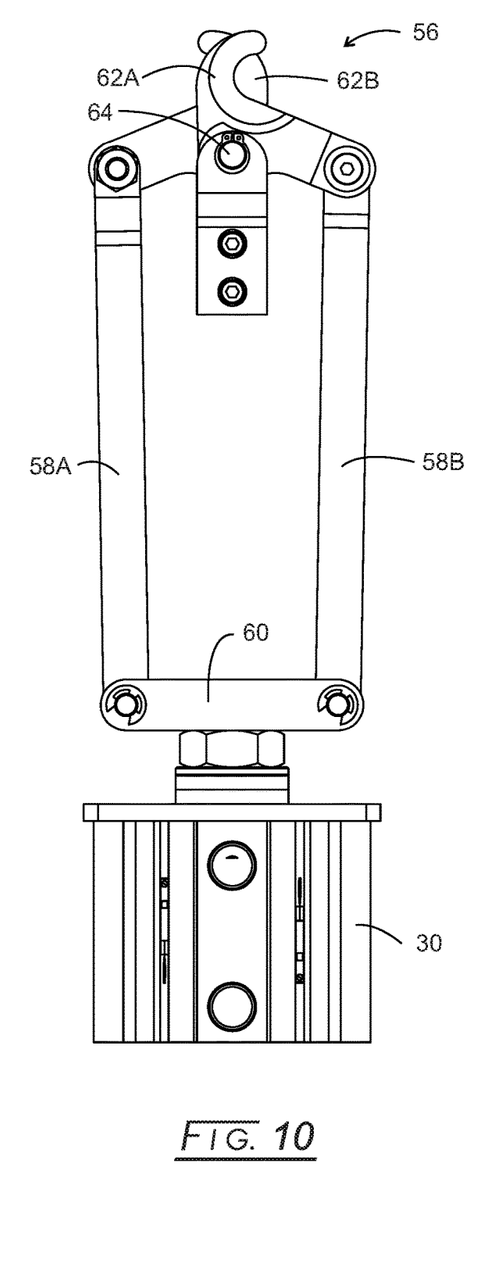
FIG. 10 is a front view of the ultrasonic wire cutter assembly in its active or cutting position.
Figure 11:
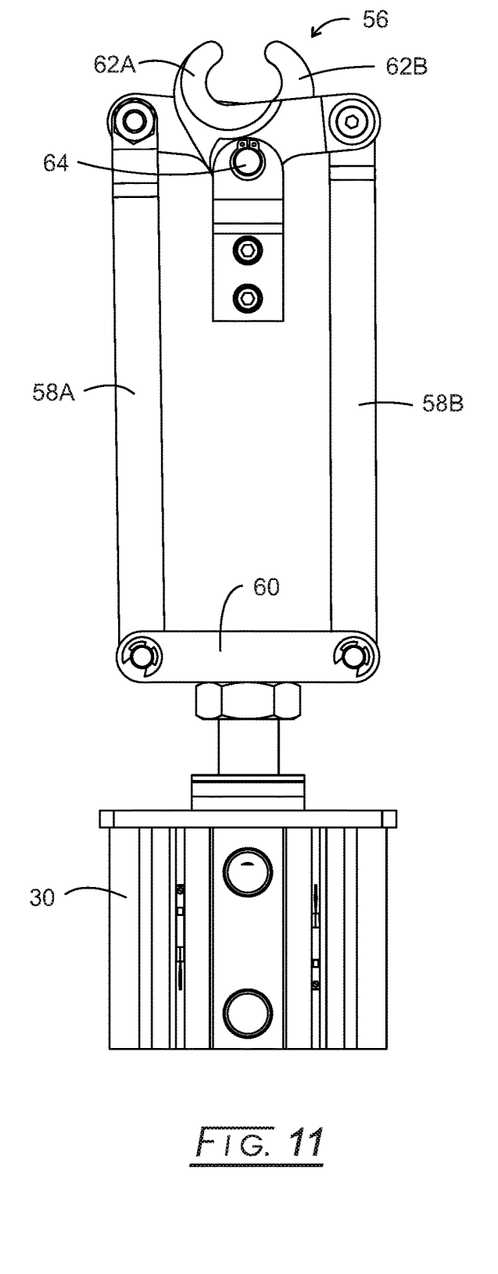
FIG. 11 is a front view of the ultrasonic wire cutter assembly in its home or non-cutting position.

A wire cutting assembly, 56 (see also FIGS. 10 and 11), is located behind clamp finger assemblies 48A/48B. Wire cutting assembly 56 cuts wires 16 should they not be properly welded to terminal 54. Cutter linear actuator 30 is attached to a pair of vertical shafts, 58A and 58B, through a horizontal shaft, 60. A pair of cutting arms, 62A and 62B are pivotally mounted to vertical shafts 58A/58B and a pivot pin, 64, that in turn is mounted to an anvil base assembly 66 (see, for example, FIG. 4). Actuation of cutter linear actuator, 30, results in horizontal shaft 60 pulling down vertical shafts 58A/58B, which in turn causes cutting arms 62A/62B to pivot about pivot pin 64 closing them to sever any wires located therebetween.

Terminal 54 fits within a recess in a nest, 68. A pair of terminal clamps, 70A and 70B, which are powered by a pair of linear actuators 82A/82B, move inwardly for 5 creating a portion of the weldment zone. A pair of adjustment knobs, 72A and 72B, adjust the position of terminal clamps 70A/70B to accommodate different size terminals. A wire gatherer tool, 74, is located behind the terminal clamp assembly and will be described later herein. An overhead crimper, 76, can be moved downwardly when actuated. A wire stop assembly, 78, lowers a strand blocker, 79, into terminal 54 by a cylinder, 77, as seen in FIGS. 5 and 6. The ends of wires 16 butt up against the strand blocker 79 and locate wires 16 in the proper position for welding. Wire stop assembly 78 is a convenient, reliable cue for the operator so that wires 16 are inserted to the proper position relative to terminal 54.

A cooling nozzle assembly, 80, is seen in FIGS. 4 and 6. A second cooling nozzle assembly is located opposite cooling nozzle assembly 80 is not seen in the drawings. Linear actuators, 82A and 82B, move terminal clamps 70A/70B inwardly. A carrier assembly, 84, moves wire gatherer 74 downwardly into position and is powered by a linear actuators 85A/85B. A horn, 86, also can be seen in FIGS. 4 and 6. A servo, 88, and connector, 90, extend from the back of termination welder 10. A servo motor, 92, for a stack, 112, including a converter, 88, is seen located above a clamp ring, 94. These components along with the stack assembly operate as described in commonly owned application Ser. No. 15/927,114 filed Mar. 21, 2018.

Figure 7:
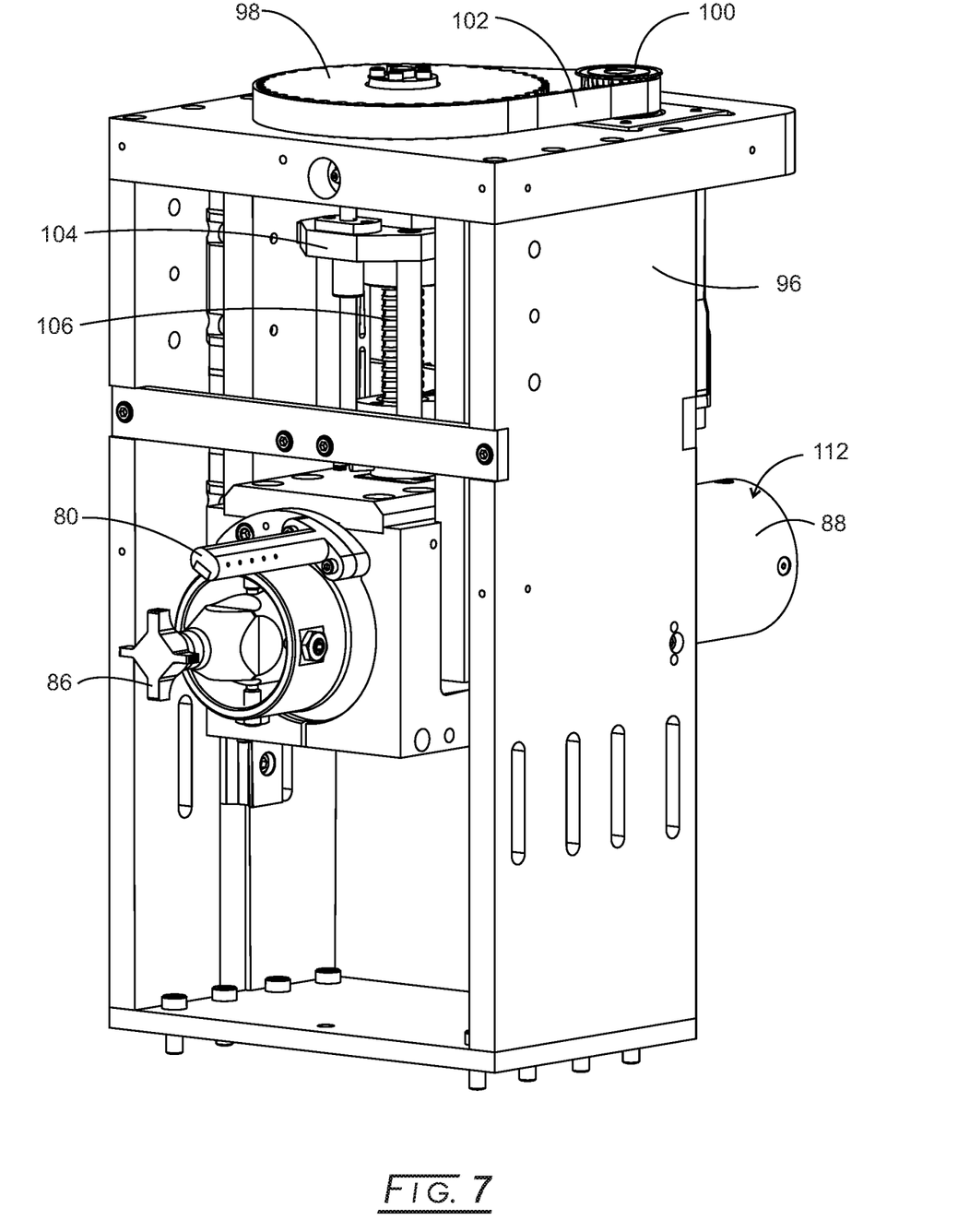
FIG. 7 is a front isometric view of the disclosed ultrasonic wire termination welder stack assembly and supporting structure.

Referring additionally to FIG. 7, shown are the stack and supporting structure. Atop supporting structure, 96, are a pair of pulleys, 98 and 100, connected by a belt, 102, for the stack assembly. A movable carriage, 104, and screw, 106, moves horn 86 into welding position. Again, operation of the stack assembly for welding can be understood from U.S. Ser. No. 15/927,114 cited above.

Figure 8:
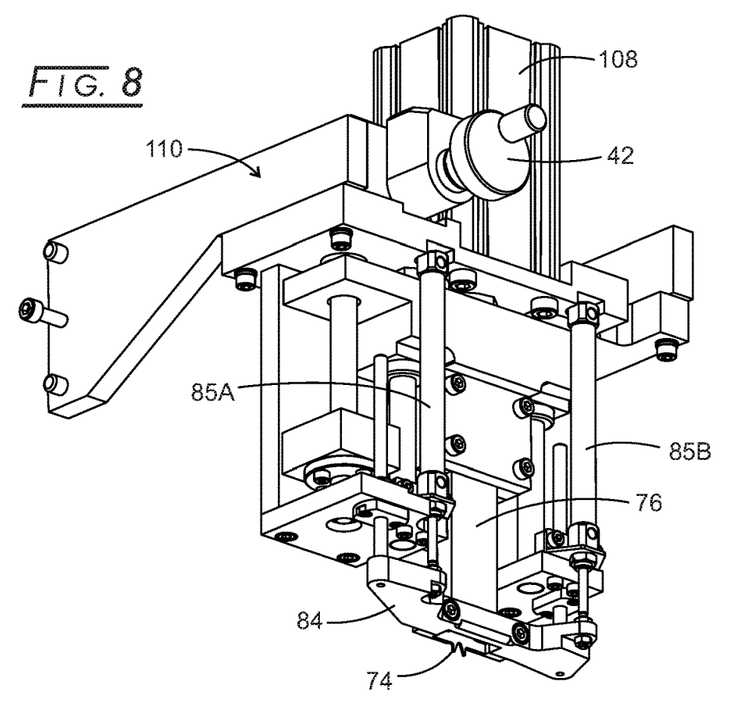
FIG. 8 is a front isometric view of the wire gatherer sub-assembly.
Figure 9:
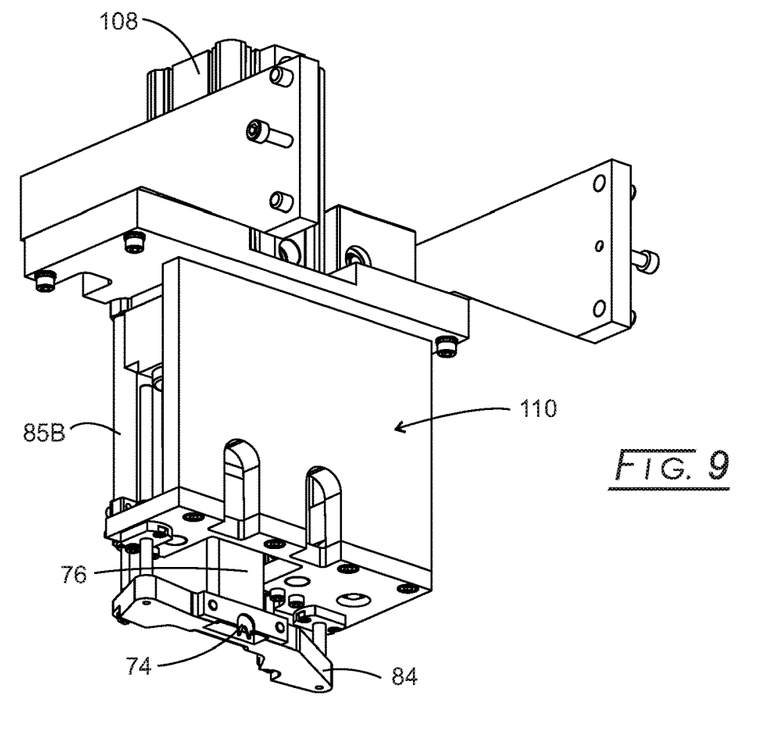
FIG. 9 is a rear isometric view of the wire gatherer sub-assembly.

The wire gatherer sub-assembly is seen in FIGS. 8 and 9. A linear actuators, 85A/85B, moves wire gatherer assembly 74 reversibly downwardly to place it in position for gathering of wires 16 for their welding to terminal 54. The frame assembly, 110, is composed of various shafts, flanges, plates, and the like, as seen in these figures. Frame assembly 110 also holds crimper assembly 76. A linear actuator, 108, moves crimper 76 downwardly crimping the legs of terminal 54 around the insulation of wires 16. The amount of crimping is adjusted by knob 42.

Figure 12:
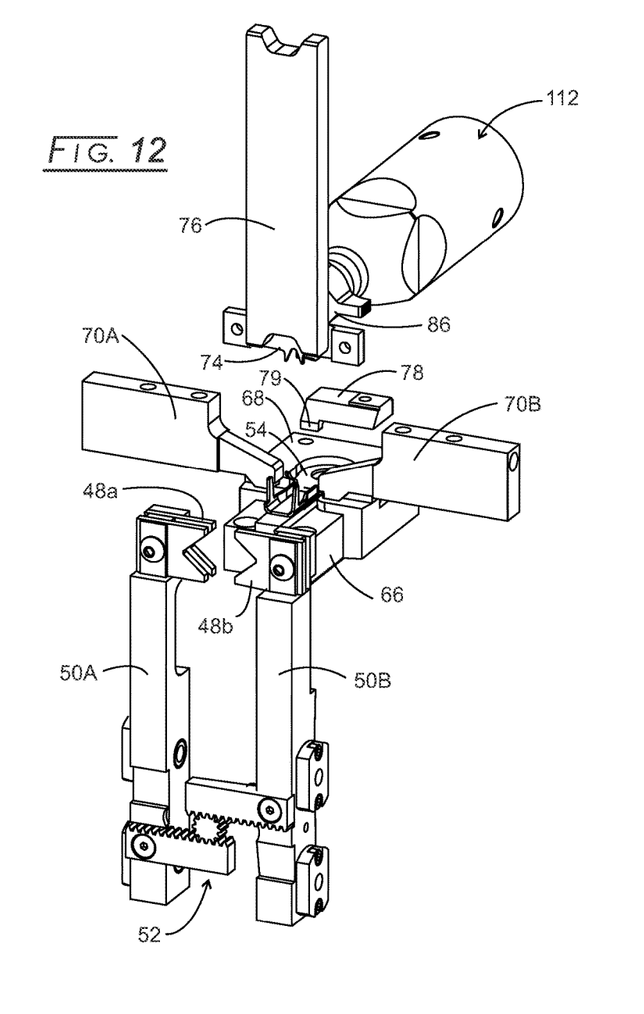
FIG. 12 is a front isometric view of the assemblies that crimp and form the weldment zone with a terminal inserted but not held.
Figure 13:
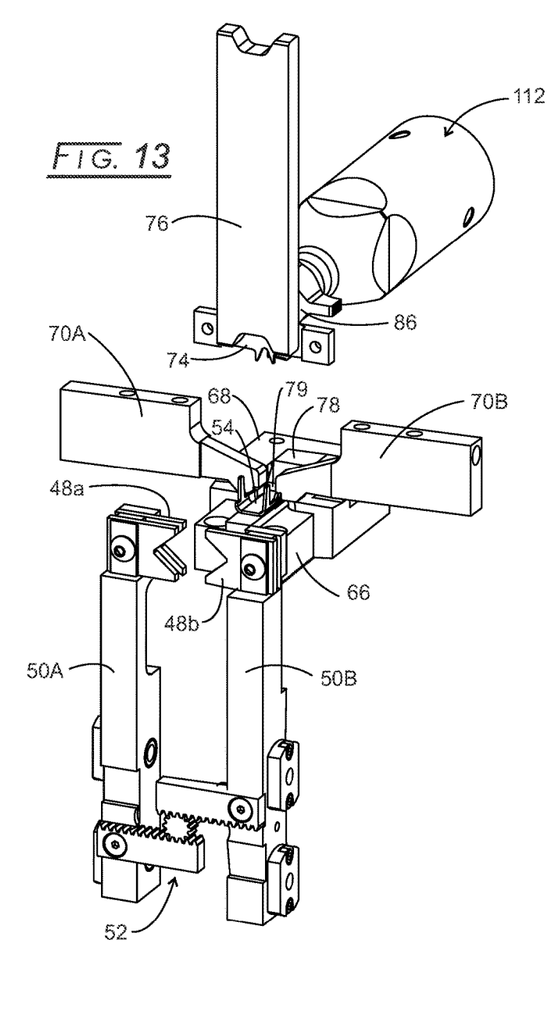
FIG. 13 is a front isometric view like that in FIG. 10, but with the side fingers being extended inwardly to secure the inserted terminal.

FIGS. 12-18 illustrate the ultrasonic welding operation sequence of operation. Much of the frame structure, actuators, and the like have been removed to reveal the essential elements operative in the ultrasonic welding operation. Referring initially now to FIGS. 12 and 13, a stack assembly, 112, is revealed for affecting the ultrasonic welding operation. The operator has inserted terminal 54 into the recess in nest 68. Wire stop 78 is in its home position in FIG. 12. In FIG. 13, wire stop 78 has been lowered so that wires 16 butt up against it when they are inserted into the machine by the operator. When wires 16 hit wire stop 78, the operator ceases inserting them. Similarly, terminal clamps 70A/70B are in their home position in FIG. 12. In FIG. 13, terminal clamps 70A/70B have been moved inwardly to form side walls for locating wires 16 into their proper position. Terminal 54 sits atop anvil base assembly 66.

Figure 14:
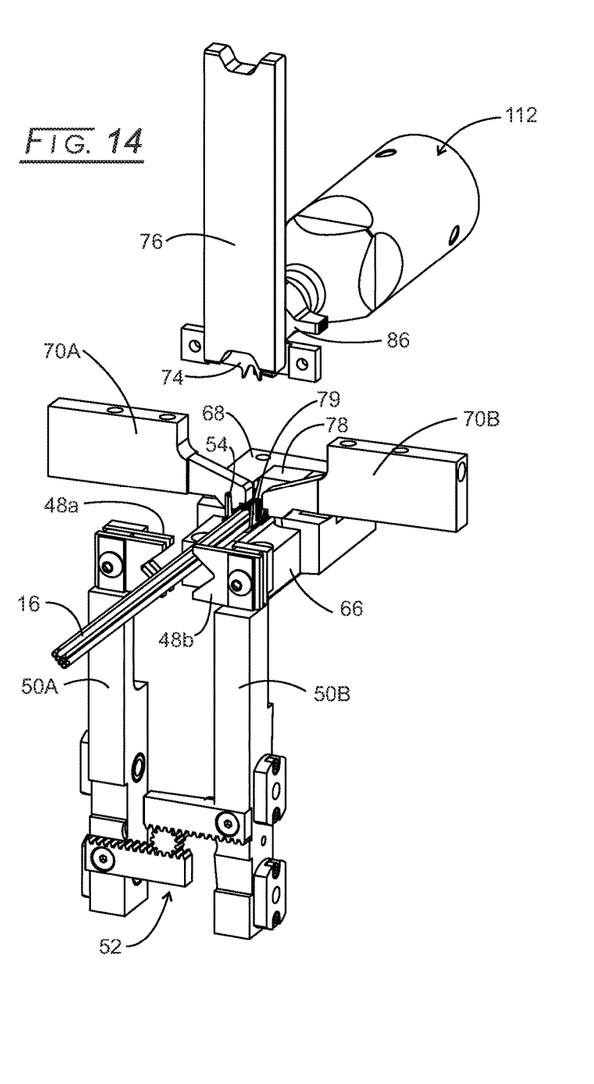
FIG. 14 is a front isometric view like that in FIG. 11, but with the bundle of wires inserted into the terminal.
Figure 15:
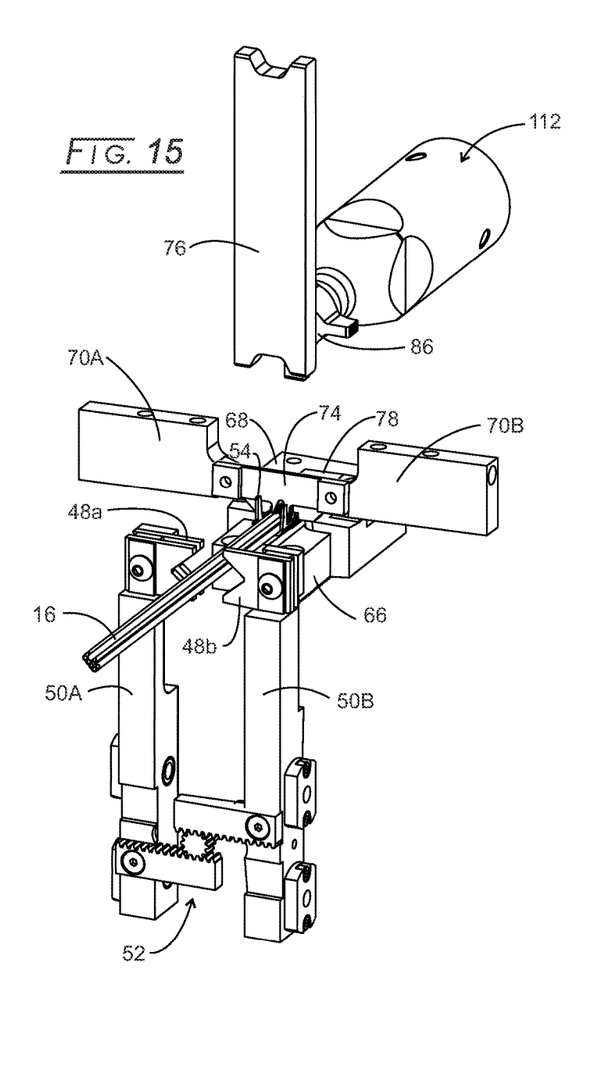
FIG. 15 is a front isometric view like that in FIG. 12, but with the wire gatherer being lowered to secure the bundle of wires.

Referring next to FIGS. 14 and 15, wires 16 have been inserted in FIG. 14. In FIG. 15, wire gatherer 74 has been lowered to gather the wires and ensure that they all are trapped within the weldment zone created by wire stop 78 and terminal clamps 70A/70B. Wire gatherer 74 is moved into contact with bare wires and not the insulation of wires 16.

Figure 16:
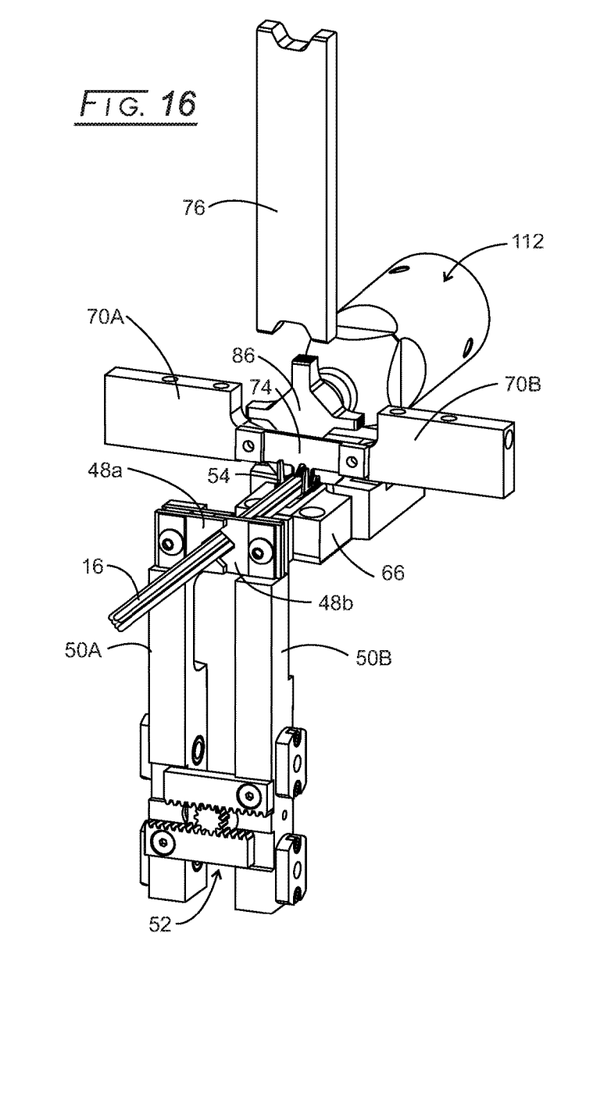
FIG. 16 is a front isometric view like that in FIG. 13, but with the sonotrode lowered into contact with the wire bundle.
Figure 17:
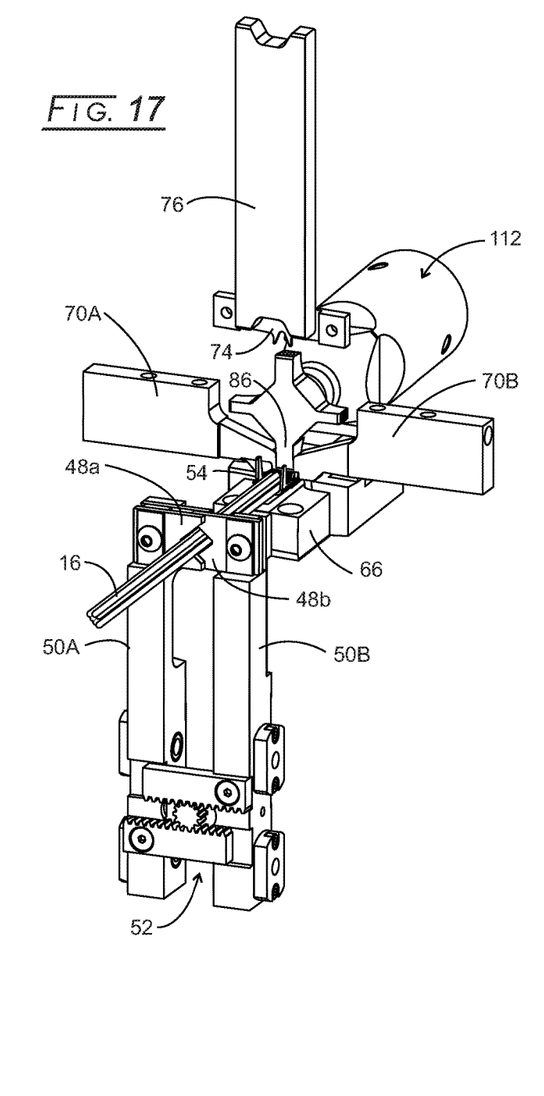
FIG. 17 is a front isometric view like that in FIG. 14, but with the wire gatherer being raised so that the sonotrode can be activated for welding.

In FIG. 16, clamp finger assemblies 48A/48B have been moved inwardly to secure wires 16. Horn 86 also has been lowered into contact with the bare ends of wire 16 in contact with terminal 54. In FIG. 17, wire gatherer 74 has been raised so that the ultrasonic welding can proceed. If wire gatherer 74 were in contact with the bare wire ends during ultrasonic welding, it would damage wires 16 as they are welded to terminal 54. Finally, in FIG. 18, a stack assembly, 112, has been raised and overhead crimper assembly 76 has been lowered to crimp the wings of terminal 54. At this point, clamp finger assemblies 48A/48B, crimper 76, terminal clamps 70A/70B and any other components holding wires 16 can be released so that the weld terminated wire assembly can be withdrawn from the welder.

Figures 18, 19, 20, 21, 22:
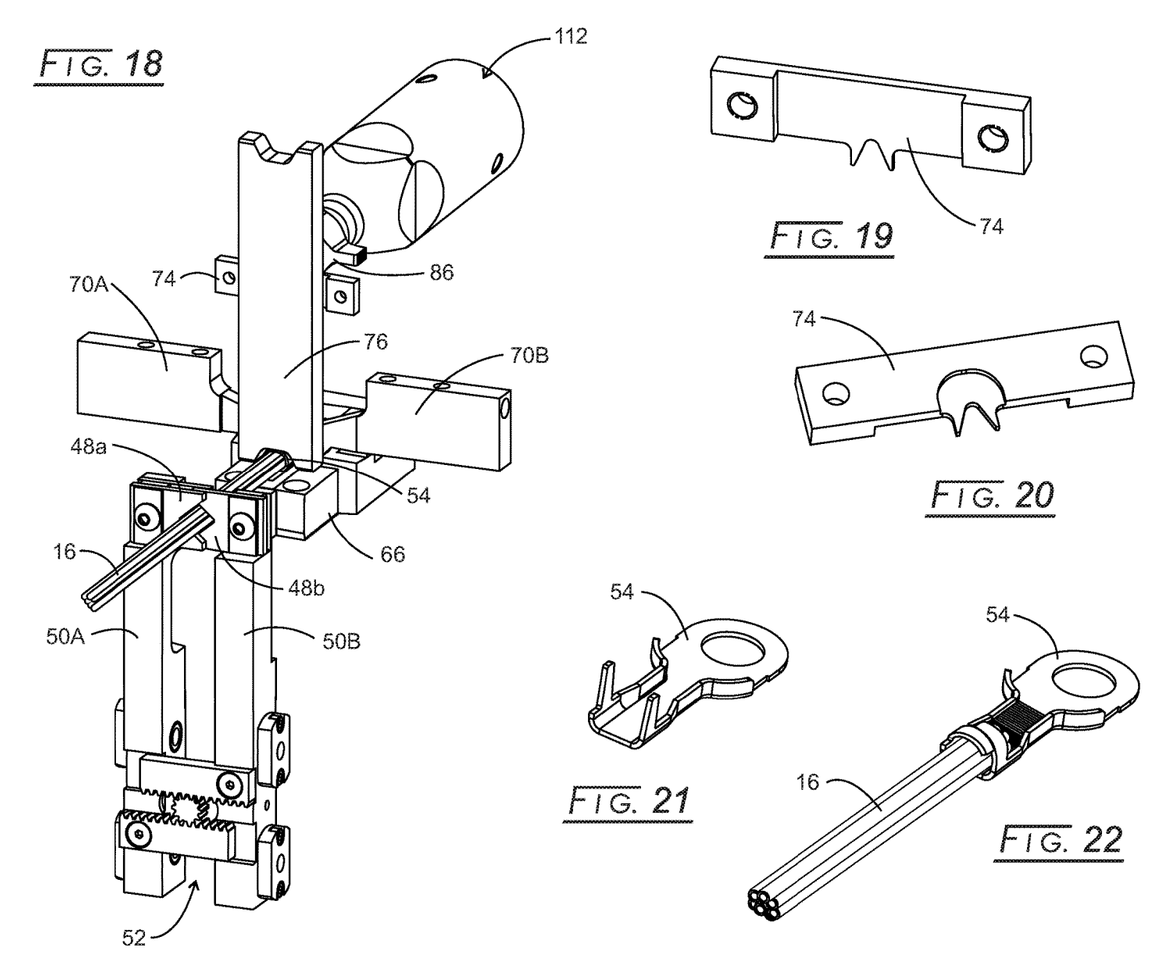
FIG. 18 is a front isometric view like that in FIG. 15, but with the crimper being lowered to hold the wire post welding.
FIG. 19 is a front isometric view of the wire gatherer.
FIG. 20 is a rear isometric view of the wire gatherer.
FIG. 21 is an isometric view of a typical terminal.
FIG. 22 is an isometric view of a typical welded wire bundled ultrasonically welded to a typical terminal by the disclosed ultrasonic wire termination welder.

Wire gatherer tool 74 is seen from its front side in FIG. 19 and its rear side in FIG. 20. For the sake of completeness, terminal 54 is shown in FIG. 21. The shape and size of terminal 54 can vary, that shown in the drawings is for illustration purposes. Should a larger or smaller terminal be encountered, a different nest with the correct sized recess would be used in the ultrasonic welding operation. Finally, the final welded product is seen in FIG. 22.

While the apparatus, system, and method have been described with reference to various embodiments, those skilled in the art will understand that various changes may be made and equivalents may be substituted for elements thereof without departing from the scope and essence of the disclosure. In addition, many modifications may be made to adapt a particular situation or material in accordance with the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the metric system and all amounts and percentages are by weight, unless otherwise expressly indicated. Also, all citations referred herein are expressly incorporated herein by reference.

We claim:

1. An ultrasonic welding assembly for joining insulated wires with bare ends to a wire terminal in a weldment zone, which comprises:
    (a) a nest (68) within the weldment zone for receiving the wire terminal;
    (b) a pair of terminal clamps (70A, 70B) extend inwardly to hold the insulated wires (16) adjacent to the weldment zone;
    (c) a wire gatherer (74) that descends upon and captures all of the wire bare ends prior to ultrasonic welding and then extends away from the weldment zone for ultrasonic welding to commence; and
    (d) a sonotrode (86) of an ultrasonic stack assembly (112) that descends into contact with the wire bare ends in the weldment zone just after the wire gatherer extends away for ultrasonically welding the wire bare ends to the wire terminal; and (e) external sensors (44, 46) wherein at least one hand of an operator must be in contact with an external sensor before clamping of the wire terminal can occur.

2. The ultrasonic welding assembly of claim 1, wherein a pair of clamp finger assemblies (48A, 48B) reversibly extend towards the insulated wires away from the weldment zone for securing the insulated wires.

3. The ultrasonic welding assembly of claim 1, additionally comprising an overhead crimper (76) crimps legs of the wire terminal (54) post ultrasonic welding.

4. The ultrasonic welding assembly of claim 1, additionally comprising a door (14) that allows an operator to place the wire terminal into the nest within the weldment zone, wherein the door must be closed for ultrasonic welding to occur.

5. The ultrasonic welding assembly of claim 1, additionally comprising a wire stop (78) against which the bare wire ends contact to indicate full insertion of the wires into welding position.

* * * * *